US00RE44122E

(19) United States
(12) Reissued Patent
Kumar

(10) Patent Number: US RE44,122 E
(45) Date of Reissued Patent: Apr. 2, 2013

(54) PORTABLE DATA ENTRY DEVICE WITH A DETACHABLE HOST PDA

(75) Inventor: Rajendra Kumar, Akron, OH (US)

(73) Assignee: Khyber Technologies Corporation

(21) Appl. No.: 13/209,691

(22) Filed: Aug. 15, 2011

Related U.S. Patent Documents

Reissue of:
(64) Patent No.: 7,577,462
Issued: Aug. 18, 2009
Appl. No.: 10/542,539
PCT Filed: Aug. 14, 2003
PCT No.: PCT/US03/25577
§ 371 (c)(1),
(2), (4) Date: Dec. 29, 2005
PCT Pub. No.: WO2004/017613
PCT Pub. Date: Feb. 26, 2004

U.S. Applications:
(63) Continuation-in-part of application No. 10/159,296, filed on May 29, 2002, now abandoned.

(60) Provisional application No. 60/404,104, filed on Aug. 15, 2002.

(51) Int. Cl.
*H04B 1/38* (2006.01)
*H04M 1/00* (2006.01)

(52) U.S. Cl. ..... 455/557; 455/556.1; 455/556.2; 455/575.1; 455/575.8; 455/90.3; 455/418; 455/420; 455/349

(58) Field of Classification Search ..... 455/90.1–90.3, 455/575.1, 575.8, 556.1–556.2, 557, 550.1, 455/344–349, 418, 420
See application file for complete search history.

(56) References Cited

U.S. PATENT DOCUMENTS 5,410,141 A * 4/1995 Koenck et al. ..... 235/472.02
5,594,952 A * 1/1997 Virtuoso et al. ..... 455/557
5,835,732 A * 11/1998 Kikinis et al. ..... 710/303
5,924,044 A * 7/1999 Vannatta et al. ..... 455/556.1
6,188,917 B1 * 2/2001 Laureanti ..... 455/573
6,266,539 B1 * 7/2001 Pardo ..... 455/556.2
6,708,887 B1 * 3/2004 Garrett et al. ..... 235/462.45
6,714,802 B1 * 3/2004 Barvesten ..... 455/575.1
7,072,688 B2 * 7/2006 Bodnar et al. ..... 455/556.2
7,095,986 B2 * 8/2006 Mager ..... 455/90.3
7,149,543 B2 * 12/2006 Kumar ..... 455/556.2
2003/0006968 A1 1/2003 Solomon

OTHER PUBLICATIONS

PDT-7500 from Symbol Technologies.
Palm Pilot from Palm, INC. of Palo Alto.
iPAQ PacketPC unite from Compaq Computer.
Symbol Products, SPT 1550 Pocketable Computers, SPT 1700 Pocketable Computers.
Monarch Palm Computing Palm III Series and Symbol SPT 1500 Computers.
Compactflash expansion pack for iPAQ 3600, 3700, 3800. 3900, 5400.
Socket In-hand Scan card Type I, Class 1 Laser.
Socket Bar Wand CF Card.

* cited by examiner

*Primary Examiner* — Tuan A Tran
(74) *Attorney, Agent, or Firm* — Hahn, Loeser & Parks, LLP

(57) ABSTRACT

An apparatus and method are disclosed that can adapt off-the shelf PDA devices (90) to user input/output applications such as data entry applications and cellular phone applications. The resulting apparatus (10) may be sized and shaped to be durable and facilitate handheld operation when the user is mobile during use. The apparatus provides features required for portable data entry such as key entry, barcode scanning, radio frequency identification, and wireless local area network (LAN) as well as wide area network (WAN) communications. The apparatus may be operated (a) in a slave mode with inclusion of a PDA device (90) for use in certain input/output operations that are processor intensive as well as (b) in a stand-alone mode without inclusion of a PDA device (90) for use in certain other input/output operations that are not processor intensive.

7 Claims, 11 Drawing Sheets

PORTABLE DATA ENTRY DEVICE WITH A DETACHABLE HOST PDA

Matter enclosed in heavy brackets [ ] appears in the original patent but forms no part of this reissue specification; matter printed in italics indicates the additions made by reissue.

CROSS-REFERENCE TO RELATED APPLICATIONS/INCORPORATION BY REFERENCE

This application is a continuation-in-part (CIP) of [pending] U.S. application Ser. No. 10/159,296 filed on May 29, 2002 *now abandoned*, which is incorporated by reference herein in its entirety.

This application claims priority to U.S. provisional application Ser. No. 60/404,104 filed on Aug. 15, 2002, which is incorporated herein by reference in its entirety.

TECHNICAL FIELD

Certain embodiments of the present invention relate to portable devices for user input/output functionality such as data entry through barcodes, radio frequency identification; key entry, voice or data communications, and other methods, More particularly, certain embodiments of the present invention relate to the use of Personal Digital Assistant (PDA) devices, and the use thereof as a portable user input/output device or in conjunction with such a device.

BACKGROUND OF THE INVENTION

Portable data entry devices are known for use in automatic identification systems, such as the bar code industry as an example. Portable data entry devices such as bar code scanners, radio frequency identification devices, and key-entry based hand held computers are used for applications such as inventory tracking, in store order entry, package delivery, route sales, or the like. Various dedicated products have been developed for this purpose, such products including a bar code scanning system, a radio frequency identification system, a data processing system, and communications features. Although such devices provide desired attributes of portability along with data capture and communication capabilities, the devices are expensive and relatively inflexible in their operation.

There have also been developed personal electronic organizers and personal digital assistant (PDA) devices. PDA devices are handheld devices with information input means and personal information management (PIM) software such as to-do lists, contact lists, and appointments. PDA devices have significant processing capabilities related to performing the desired functions.

Compared with portable data entry devices, PDA devices have the benefit of the economies of scale. Therefore PDA devices are less expensive, more compact, and offer higher performance in several areas by employing new technologies at a faster pace. Consequently, it would be advantageous to employ PDA devices for portable data entry applications. However, PDA devices lack several key features essential to many of the portable data entry applications, such as barcode scanners, keyboards with numeric and/or alphabetic characters, wireless communication systems, and radio frequency identification readers.

Another key feature missing in the PDA devices is ruggedness, which is essential when the user is mobile during the use of the device. (In contrast, the users of PDA devices are generally stationary during the actual use of the device). Additionally, PDA devices are not configured with a form factor to allow simple portable data entry in the variety of different environments in which portable data entry devices are used.

Some manufacturers of the barcode industry have attempted to solve these problems by licensing the internal electronic assemblies of the PDA devices from their suppliers and packaging them with portable data entry features in custom designed cases. Examples of such products are models SPT-1500 and SPT-1700 from Symbol Technologies of Holtsville, N.Y. However, this process is time consuming and requires expensive re-engineering, which has to be repeated with the introduction of each new PDA. Also, since the resulting devices are produced in smaller volumes, significant benefits of using the PDA technology are lost.

Some manufacturers have provided devices for adding peripheral functions to PDA devices. One example of such a cradle is model 6016 Handheld Printer from Monarch division of Paxar Corporation of White Plains, N.Y. Another example of a device is the Card Expansion Pak unit provided by Compaq Computer Corporation of Houston, Tex. for its iPAQ Pocket PC units. Although these products do a good job of adding a special feature to the PDA such as printing and card slots, they fail to make the PDA devices suitable for portable data entry because they do not provide the characteristics and flexibility for use in various portable data entry applications. Further, such devices don't provide the ruggedness, size, and shape to facilitate handheld operation when the user is mobile during the use of the device.

In addition to the above drawbacks, the current art does not fulfill an established need in the industry of a device that is capable of operating, in some capacity, on a standalone basis without inclusion of a PDA device. This need stems from the fact that certain portable data entry operations are not processor intensive and hence do not require the use of a PDA unit as a part of the data entry solution. By selectively eliminating the PDA in such data entry operations, the weight of the handheld solution can be kept minimal while maintaining the option of using a PDA in other applications that may be relatively much more processor intensive.

Cellular telephones and combined cellular telephones and PDA's have been developed. In a combined device, a cellular telephone and a PDA are fully integrated into a single unit. These combined units tend to be larger than a PDA or a cellular telephone by itself and may be more cumbersome to use than the individual device (i.e., PDA or cellular telephone).

Further limitations and disadvantages of conventional, traditional, and proposed approaches will become apparent to one of skill in the art, through comparison of such systems with the present invention as set forth in the remainder of the present application with reference to the drawings.

BRIEF SUMMARY OF THE INVENTION

An embodiment of the present invention provides a unit that can adapt off-the-shelf PDA devices to certain user input/output applications such as portable data entry applications, data management applications, image capture applications, and cellular telephone or wireless communication applications. The unit is operable either alone or in conjunction with a PDA device. The unit may be sized and shaped to be rugged and/or to facilitate handheld operation when the user is mobile during use. The unit provides features desired for portable data entry and/or communications or imaging, such as key entry, barcode scanning, radio frequency identification, and wireless communication, such as local area network (LAN), wide area network (WAN) communications, cellular communications or camera. An embodiment of the present invention enables the user input/output unit to be operated (a) in a slave mode with inclusion of a PDA device for use in certain portable user input/output operations, such as those that are processor intensive as well as (b) in a stand-alone mode without inclusion of a PDA device for use in certain other portable user input/output operations, such as those that are not processor intensive.

An embodiment of the present invention includes a method to provide user input/output capability by docking an off-the-shelf PDA device with a user input/output unit that may comprise, for example, a hand-held data entry housing, a docking port, a camera, or a cellular telephone. At least one docking port is provided on the user input/output unit for selective coupling of a PDA device thereto, wherein upon coupling of a PDA device, the processing system of the PDA device is usable for user input/output applications such as data entry and cellular telephone. The user input/output unit is usable in a first mode with a PDA device coupled therewith and a second mode without the PDA device. In an embodiment of the present invention, the user input/output unit includes a user interface, such as a keypad with keys for numeric entry and/or a group of keys for alphabetic entry. The user input/output unit may also comprise a docking port, such as a cavity that is formed to accept the PDA device to dock into it. A docking connector is located in the cavity and mates with the input-output connector of the PDA device when the PDA device is docked into the cavity. The user input/output unit includes an interface circuit that connects the docking connector to at least one of the components of the user input/output unit and puts it in control of the PDA device when the PDA device is docked into the user input/output unit. Various aspects of the present invention are similar to the invention as set forth in pending U.S. patent application Ser. No. 10/159,296, which is hereby incorporated by reference.

These and other advantages and novel features of the present invention, as well as details of an illustrated embodiment thereof, will be more fully understood from the following description and drawings.

DETAILED DESCRIPTION OF THE INVENTION

In general, an embodiment of the present invention comprises a user input/output unit for input and/or output applications such as data entry, data management, cellular telephone communications, image capture via a camera or the like. The unit is preferably sized and shaped to facilitate handheld operation when the user is mobile during the use of the unit. The unit may encase or attach to a PDA unit when docked so as to protect the PDA unit against damage during use in harsh environments.

The above-described user input/output unit may also include a wireless radio module for wireless communication and one or more of a scanner for reading barcodes, a reader for radio frequency identification, and a wireless radio module for wireless communication.

The user input/output unit 20 may comprise, for example, a hand-held cradle unit having an auxiliary processor, an auxiliary battery, and other components, which are connected and assembled to enable the handheld cradle unit to operate on a standalone basis without inclusion of a PDA device. In addition, the auxiliary battery in the handheld cradle unit will increase the operating life of the combined unit (i.e., PDA and cradle unit) in between battery charges.

The handheld input/output unit may be equipped with a handle-grip to facilitate gun-styled scanning. The handle-grip can be equipped with a trigger switch for barcode scanning and/or radio frequency identification as may be the case. Alternately, the handheld input/output unit may have a reduced circumference at the keypad area to allow a comfortable grip of the device in one hand during use. The hand held input/output unit may also be configured to allow operational coupling between off-the-shelf PDA devices which may have different dimensional characteristics.

In an embodiment of the present invention, the user input/output unit provides a docking port such as, for example, a cavity in which a PDA device mates with the docking connector, while allowing various width PDA devices to be accommodated therein. The form of the input/output unit also facilitates coupling of a PDA device thereto for use, with the resulting overall configuration being small and configured for handheld operation. Such features will be seen in the embodiments set forth hereafter. Alternatively, the input/output unit may comprise a portion which is selectively attachable to a PDA device in another manner for use therewith or independently.

Figure 1:
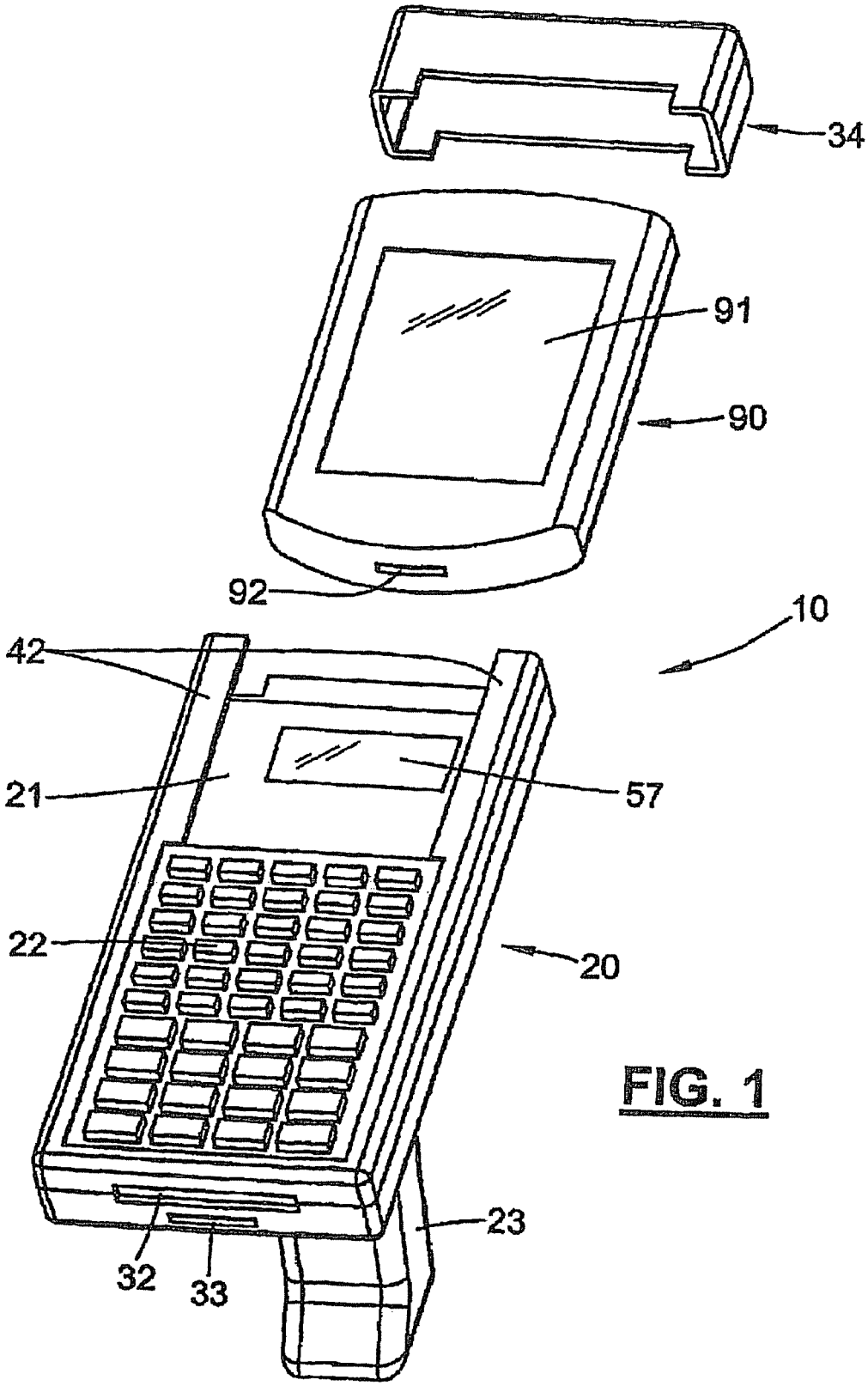
FIG. 1 illustrates an exploded view of a user input/output unit comprising a portable data entry device, in accordance with an embodiment of the present invention.
Figure 5:
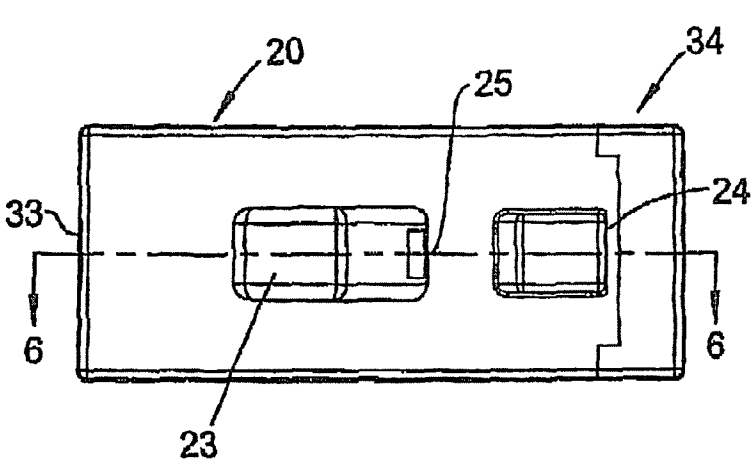
FIG. 5 illustrates a bottom view of the device shown in FIG. 1.
Figure 4:
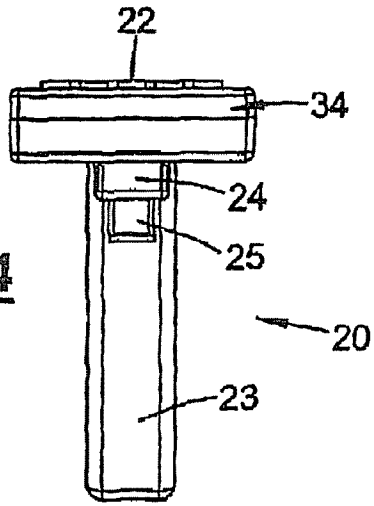
FIG. 4 illustrates a front view of the device shown in FIG. 1.
Figure 2:
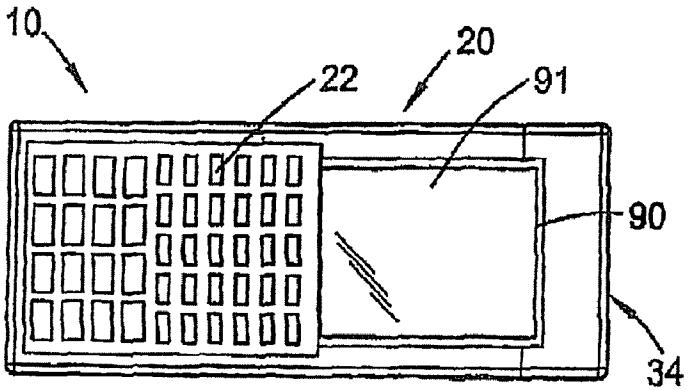
FIG. 2 illustrates a top view of the device shown in FIG. 1.
Figure 3:
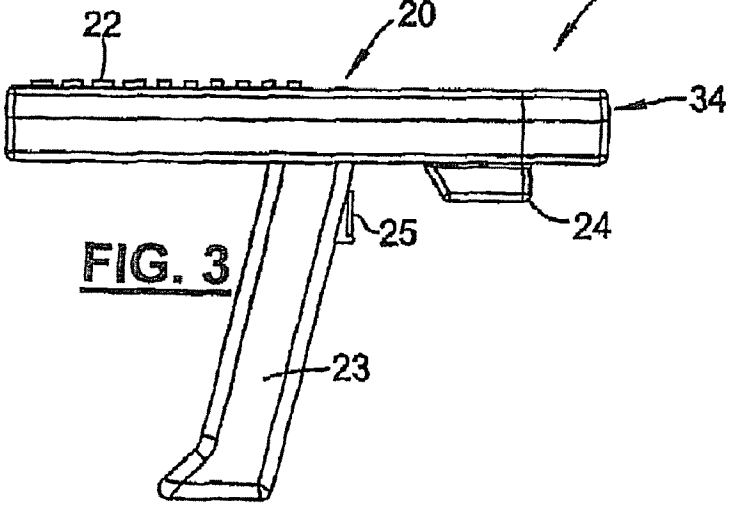
FIG. 3 illustrates a side view of the device shown in FIG. 1.
Figure 6:
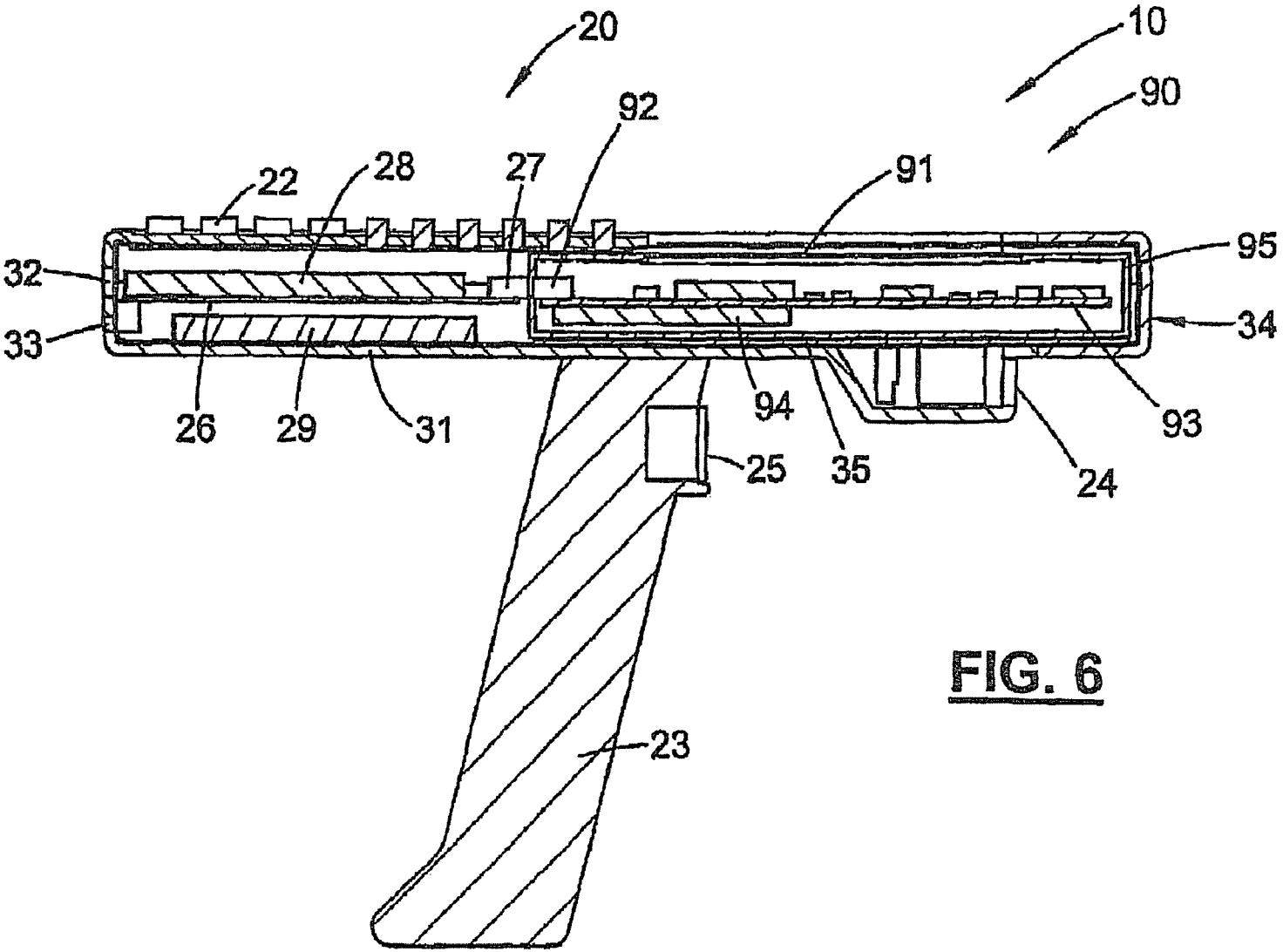
FIG. 6 illustrates a cross sectional view taken along a line A-A of FIG. 5 showing internal components of the device, in accordance with an embodiment of the present invention.
Figure 7:
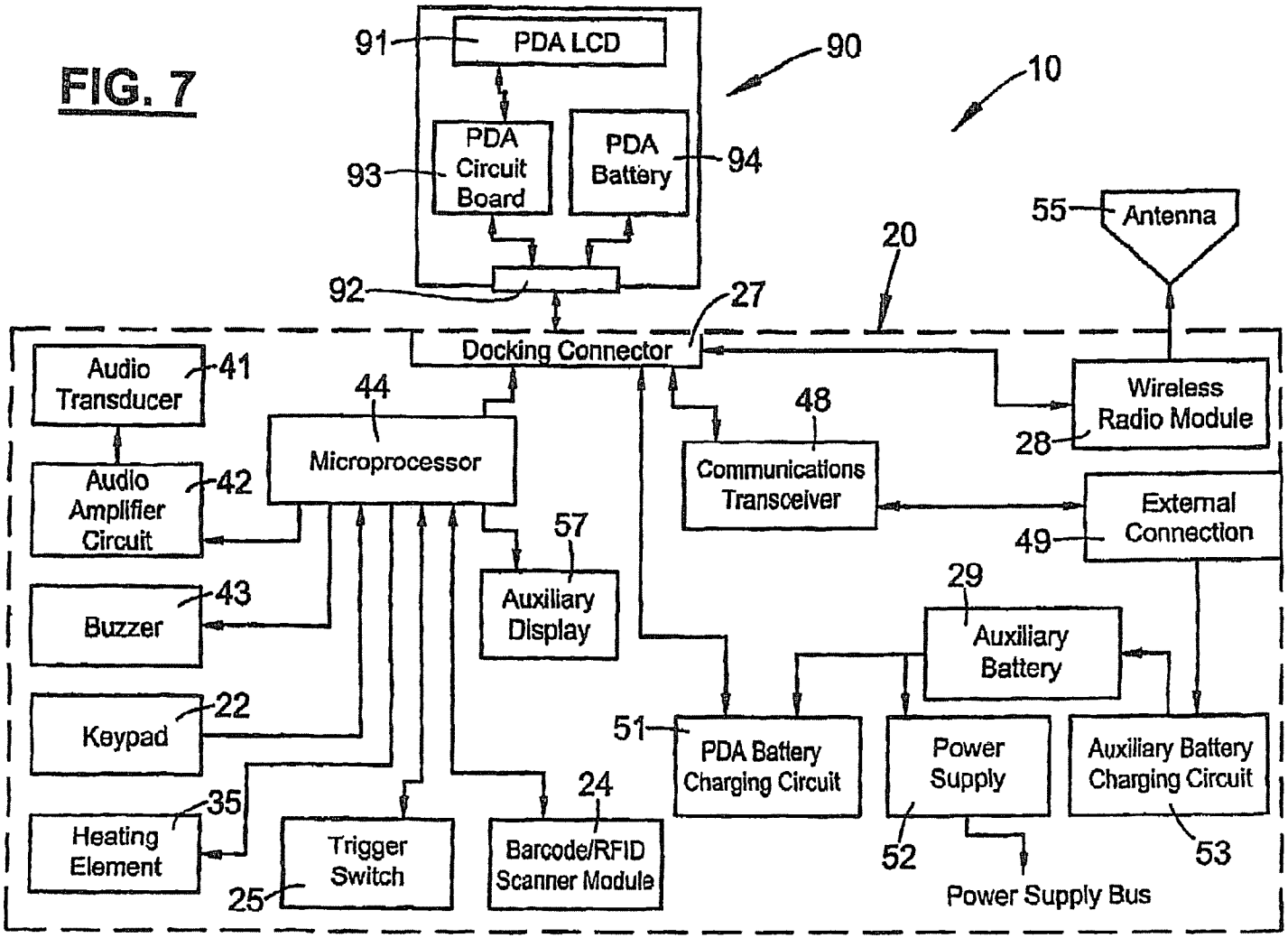
FIG. 7 illustrates a schematic block diagram of the electrical components associated with the device shown in FIG. 1, in accordance with an embodiment of the present invention.
Figure 8:
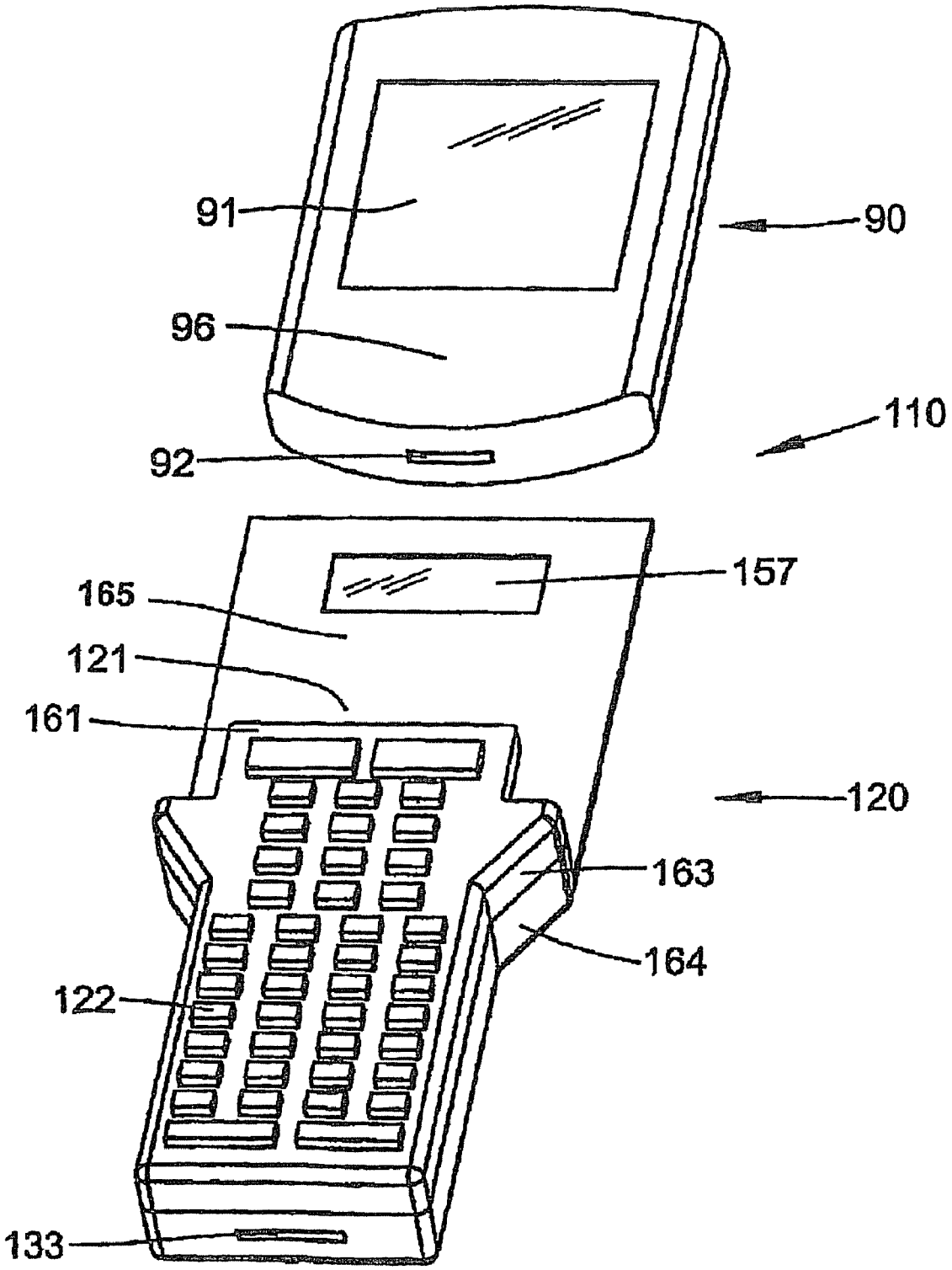
FIG. 8 illustrates an exploded view of a first alternate embodiment of a portable data entry device in accordance with various aspects of the present invention.
Figure 9:
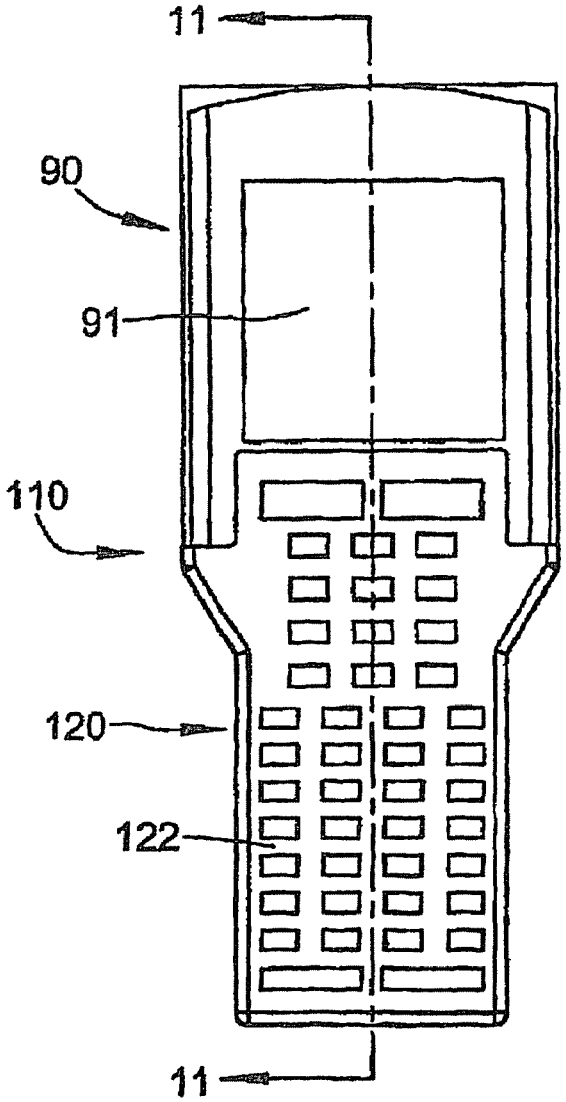
FIG. 9 illustrates a front view of the device shown in FIG. 8.
Figure 10:
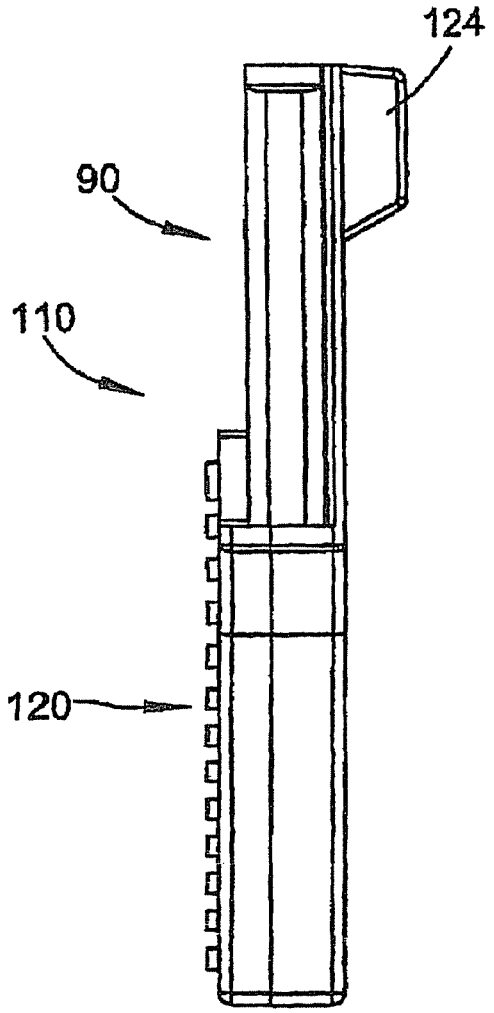
FIG. 10 illustrates a side view of the device shown in FIG. 8.
Figure 11:
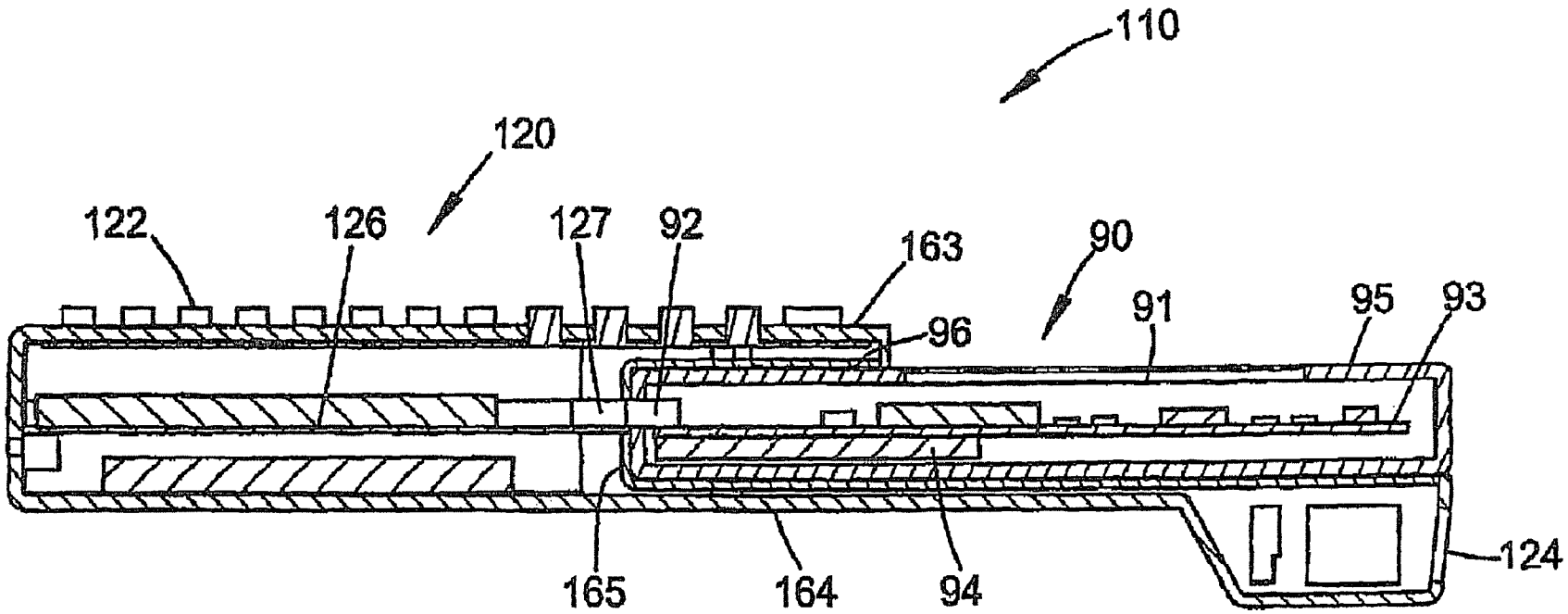
FIG. 11 illustrates a cross sectional view of the device taken along line 11-11 shown in FIG. 9, in accordance with an embodiment of the present invention.

Turning now to a first embodiment according to the invention as shown in FIGS. 1-7, a portable data entry device 10 comprises a user input/output unit 20 (i.e., a), to which is selectively coupled an off-the-shelf PDA unit 90. The PDA unit 90 includes a display 91, on the front, and an input-output connection 92 on the bottom end. The cross-sectional view of FIG. 7 shows an internal printed circuit board with attached circuitry 93, the internal battery 94 of the PDA, and the external case 95 of the PDA. Input/output unit 20 comprises a cavity 21, auxiliary display 57, keypad 22, and optional handle 23. A barcode (Symbol 923 engine, Holtsville, N.Y.) and/or a RFID reader (Tiris Series 2000 Mini RFM Engine and Antenna from Texas Instruments, Dallas, Tex.), scanning module 24, works in coordination with a trigger switch 25 mounted on the handle 23. PDA unit 90 is inserted into the cavity 21 of input/output unit 20. Optional end cap 34 protects the PDA 90 from damage in a portable data entry environment. The input/output unit design is such that at least the active portion of display 91 of the PDA 90 is clearly visible when the PDA 90 is fully docked in the cavity 21. Any subsection of the external case 95 that resides below the screen 91 in the facing front view may be covered over by the input/output unit keypad 22. In one operational mode, once PDA 90 is fully docked in the cavity 21, the operational switches or other actuators of the PDA unit 90 are covered and rendered inoperational. Alternatively, the input/output unit 20 could be configured to allow access to these actuators if desired. Associated with the input/output unit 20, a wireless communication module or other operational module 28 (shown in FIG. 6) may be provided. The module 28 may further be configured to be insertable through a module opening 32. The opening 32 allows for the user to insert, remove, or replace wireless modules. An external connector 33 allows for the unit to be charged and for data to flow to a connected PC or other data terminal. The input-output connection 92 of the PDA unit 90 connects to input/output unit docking connection 27 (ELCO, Molex etc. . . . ) when PDA unit 90 is docked into the cavity 21. The docking connection 27 allows operational connection between the PDA unit 90 and the internal circuitry of the input/output unit 20. Part of this connectivity occurs through microprocessor 44. This operational connection between the input/output unit 20 and the PDA unit 90 allows access to the PDA unit operational characteristics in use with the input/output unit 20. In this manner, the PDA device 90 and its processing capabilities are combined with features of the input/output unit 20 to provide a fully functional portable data entry device having characteristics (e.g., data management, order entry, price verification, contact data base management, and data processing) of custom manufactured devices, but reaping the advantage of the economies of scale provided by the manufacture of PDA devices 90 for other uses. The input/output docking connection 27 fully integrates the PDA unit 90 electronics with that of the input/output unit 20 to provide various desired attributes in the portable data entry device formed by their combination. As noted in FIG. 6, the input/output unit 20 also comprises a main circuit board 26, of which its components will be described in more detail with reference to FIG. 7. Other electronic components, such as the wireless interface module 28, battery 29 and the like, are encased within the input/output unit 20, which may be formed of a hard plastic material or the like to provide desired ruggedness for the environments in which it is to be used.

The block diagram representation of the electrical components of unit 10 according to this embodiment is shown in FIG. 7. PDA unit 90 encloses the input-output connection 92 of the PDA. This connection 92 is attached to the PDA battery 94, and the PDA circuit board 93. The PDA circuit board is in turn connected to the LCD display 91 of unit 90. When unit 90 is fully seated in the cavity 21, the connector 92 is connected to the docking connector 27 of input/output unit 20.

The docking connector 27 of the input/output unit 20 is connected to various electronic components to interface the components with PDA unit 90. The microprocessor 44 acts as an interface for some of the signals. As examples, the docking connector 27 may connect to the audio amplifier 42, which is connected to the audio transducer 41 through the microprocessor 44. The audio amplifier circuit 42 and connected audio transducer 41 may be provided to alert the user as to when a proper reading has been obtained by the portable data entry device as an example. Alternatively, wireless audio communication may be provided by the wireless module 28 through the audio circuit. The docking connector may also be connected to an indicator, such as a buzzer 43, and the keypad 22 through the microprocessor 44. The barcode/RFID scanner module 24 and trigger switch 25 also interface to the PDA 90 via the microprocessor 44 and docking connector 27. Through the docking connector 27, the PDA also interacts with the communication transceiver 48. This transceiver offers a means to communicate outside of the input/output unit 20 via the external connection 49.

The external connection 49 allows for a standard connection to a PC, or other data-gathering terminal. External connection 49 also allows for the charging of the input/output unit battery 29. The battery charging is performed via the battery charging circuit 53. The battery 29 may be connected to the power supply 52, and the above-mentioned PDA battery charging circuit 51. In this manner, for use as a portable data entry device, the input/output unit 20 may be connected to an external power supply via the external connection 49 to provide recharging of both the battery 29 as well as the PDA battery 94. It should also be recognized that, based upon the interconnection between the PDA unit 90 and the power supply 52 of the input/output unit 20, the power supply to either operate components of the input/output unit 20 or PDA unit 90 may be supplied from either battery power source to facilitate extended operation for use as a portable data entry device.

In the case where input/output unit 20 will be used alone, without PDA unit 90, the auxiliary display 57 will be used to alert the user as to actions taken by the user, possibly through the barcode/RFID scanner module 24. The auxiliary display is controlled by the microprocessor 44.

The block diagram depicts the wireless interface module 28 that is connected to the antenna 55. This wireless module communicates to the PDA device 90 through the docking connector 27. In a variation of the embodiment, the input/output unit 20 may not include wireless interface module 28. In this case, there would either be no wireless interface, or a wireless interface supplied by the PDA unit 90.

Alternatively, the portable data entry device created by the combination of PDA unit 90 with input/output unit 20, may contain one of several variations of the embodiment, in relation to the battery power supplied from the PDA unit 90 and the input/output unit 20. The first variation would be that units 90 and 20 contain their own batteries, and no battery power would be transferred between the two. The second variation would be that the input/output unit 20 would contain the only battery, and this one battery would power both the PDA unit 90 and the input/output unit 20. The third variation would have both unit 90 and 20 including batteries, where unit 90 provides power to and charges the battery of unit 20 where available. The fourth variation would have both unit 90 and 20 including batteries, were unit 20 provides power to and charges the battery of unit 90 where available.

Turning now to FIGS. 8-11, an alternate embodiment of the invention is shown. As in the previous embodiment, the input/output unit identified as 120 provides interconnection to an off-the-shelf PDA unit 90, in a manner similar to that previously described. The PDA unit 90 again comprises a display 91, a docking station 92 and a series of control buttons or the like on a front panel 96. The portable data entry device 110 is formed by interconnection of the PDA unit 90 with the input/output unit 120. In this embodiment, the input/output unit 120 is configured to provide a handheld portable data entry device when combined with PDA unit 90. In this embodiment, the input/output unit 120 provides a small, low profile handheld unit in combination with the PDA unit 90. The input/output unit 120 comprises an auxiliary display 157, a keyboard 122, which as shown is formed on a reduced dimension handheld portion of the input/output unit 120, to facilitate grasping with one hand. A cavity 121 is again provided to accept the PDA unit 90 in a docking configuration, but the cavity is preferably open on the outside edges thereof to allow different width PDA units 90 to be accommodated therein. As the dimensions of various PDA units 90 which are manufactured by third party manufacturers can vary, accommodating different dimensional characteristics in the handheld input/output unit 120 provides flexibility in selecting which PDA unit 90 best suits a particular users application.

In this exemplary invention, a portable data entry device can be created, with the added functionality of a removable PDA. When mated with the input/output unit, the PDA unit and its main processor becomes the main controller for the entire portable data entry device. As a stand-alone device, the system can still perform certain desired functions without the PDA device.

In this embodiment, the case of the handheld unit 120 may be formed of a front shell 163, back shell 164 and cavity shell 165 or other similar configuration. Within the formed shell of the handheld unit 120, the printed circuit board 126, keypad 122, barcode scanner 124, and other components may be housed to form a rugged handheld portable data entry device. A docking connector 127 is positioned to receive and connect to the PDA device 90 via the output connector 92. The housing of the handheld unit 120 again allows docking of the PDA unit 90 such that the display 91 is unobstructed for viewing of information thereon during use as a portable data entry device.

Figure 13:
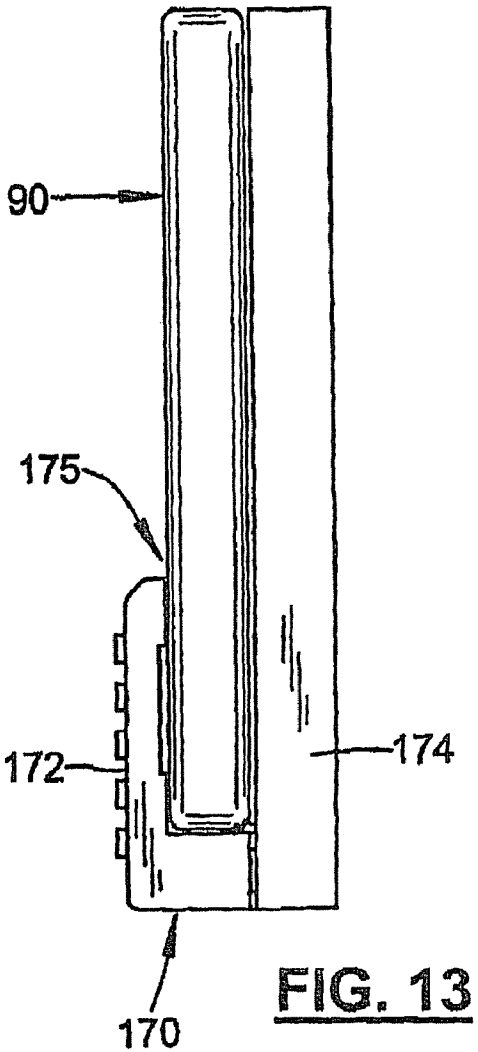
FIG. 13 illustrates a side view of the embodiment as shown in FIG. 12.
Figure 12:
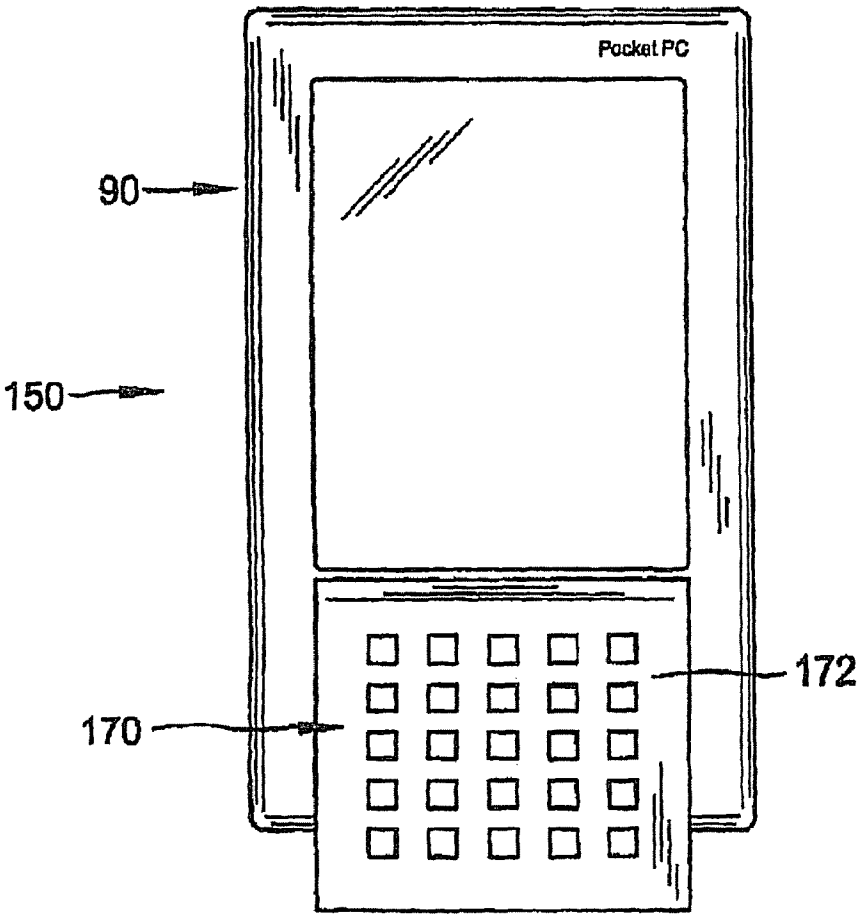
FIG. 12 illustrates a front view of a second alternate embodiment of a portable data entry device according to various aspects of the present invention.

Another embodiment of the invention is shown in FIGS. 12 and 13, wherein a portable entry device 150, including a selectively coupled PDA unit 90 and a handheld input/output unit 170 is provided. In this embodiment, the input/output unit 170 is reduced in size such that it accommodates handheld usage when combined with the PDA unit 90, but is otherwise very small and easily handled. In this embodiment, the handheld input/output unit 170 is configured to have a front shell portion 172, a back shell portion 174 and a cavity 175 to receive the PDA unit 90. Within the handheld input/output unit 170, there may be provided various of the electronic components associated with the embodiments as previously described, including an operator interface such as a keypad, an auxiliary display, a radio frequency identification system, a barcode scanner and the like. The handheld input/output unit 170 provides a unique handheld assembly when PDA unit 90 is docked therewith, which is of extremely low profile and yet facilitates one hand usage as a portable data entry device. The back portion of the handheld input/output unit 170 provides support for the PDA unit 90 and facilitates grasping by the user without requiring handling of the PDA unit 90. The PDA unit 90 is also protected by a front portion of the handheld unit 170 when in its docked position.

Figure 14:
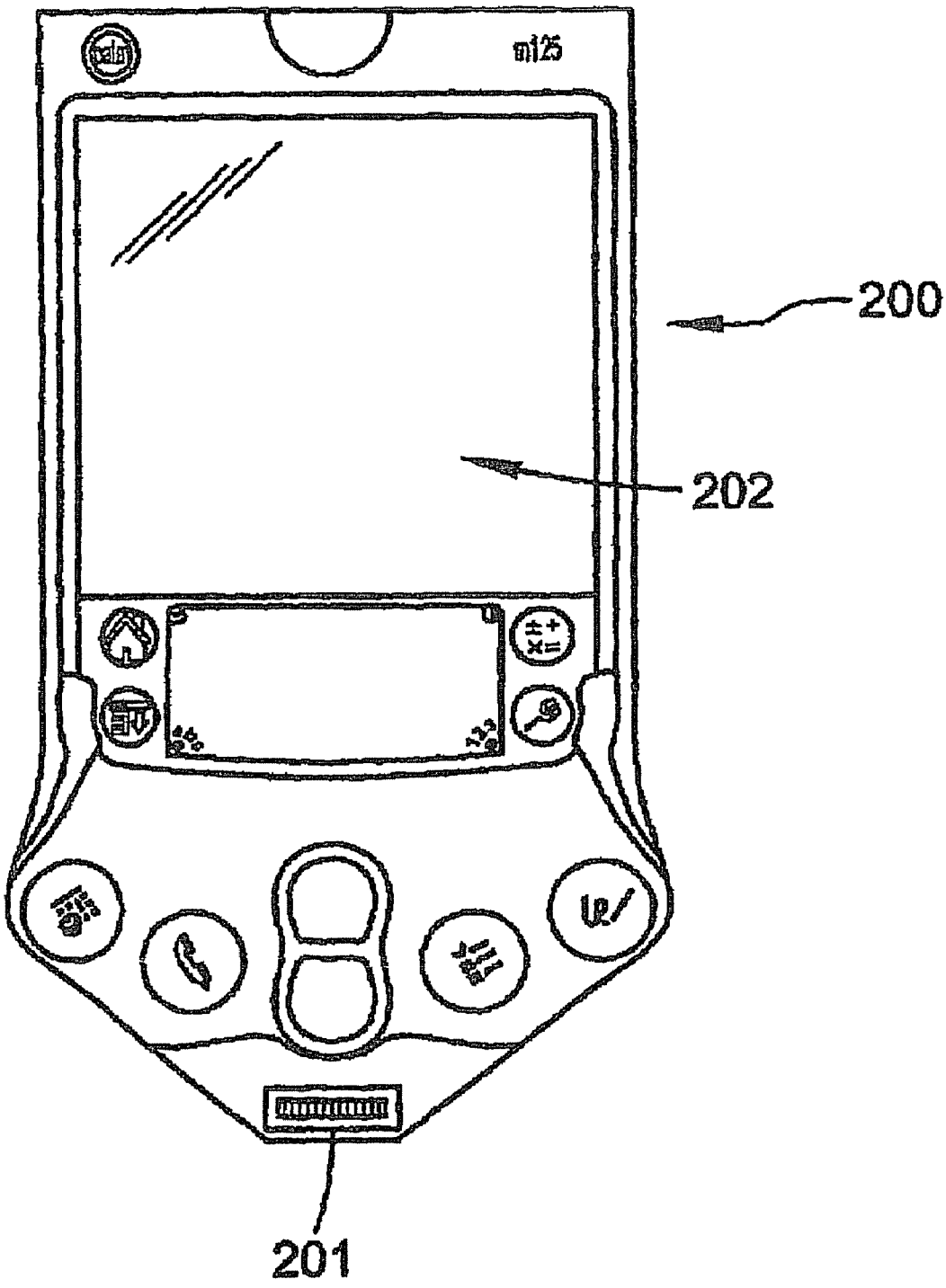
FIG. 14 illustrates an exemplary PDA device, in accordance with an embodiment of the present invention.

FIG. 14 illustrates an exemplary PDA device 200, in accordance with an embodiment of the present invention. The PDA device 200 includes a display 202 and an electrical connector 201 for docking to a user input/output unit such as a cellular telephone. The PDA device may also include other mechanical contact apparatus to help secure the user input/output unit to the PDA device 200.

Figure 15:
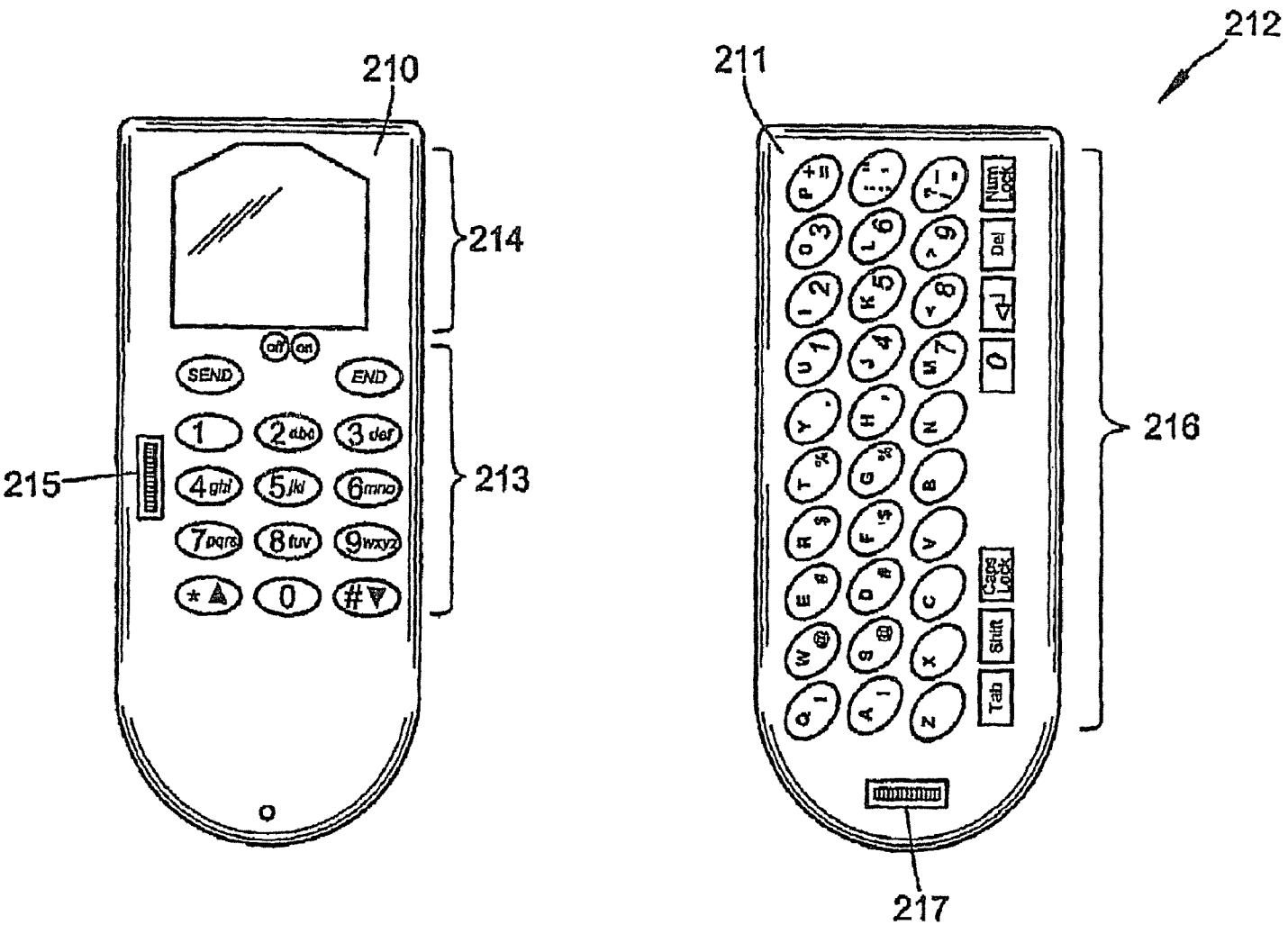
FIG. 15 illustrates the front side and back side of an exemplary cellular telephone, in accordance with an embodiment of the present invention.

FIG. 15 illustrates the front side 210 and the back side 211 of an exemplary cellular telephone 212, in accordance with an embodiment of the present invention. The front side 210 of the cellular telephone 212 includes an exemplary cellular telephone user interface keypad 213, a display 214, and a docking connector 215 for mating with the electrical connector 201 of the PDA device 200. The back side 211 of the cellular telephone 212 includes a keypad 216 for alpha-numeric data entry and a docking connector 217 for mating with the electrical connector 201 of the PDA device 200.

Figure 16B:
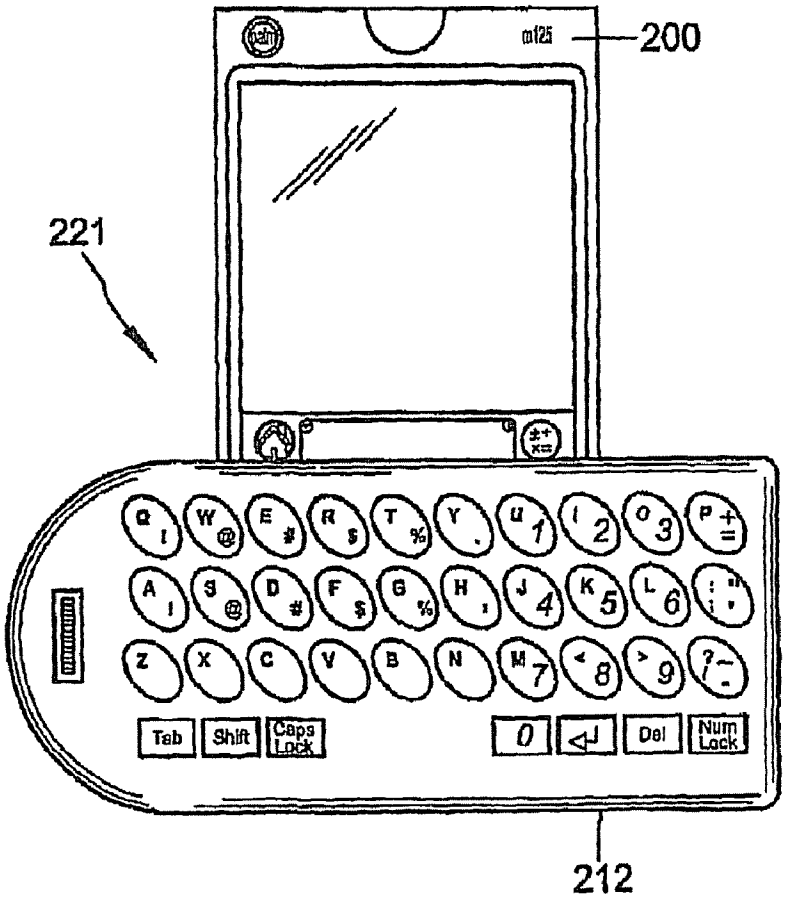
FIGS. 16A and 16B illustrate two embodiments of attaching the cellular telephone of FIG. 15 with the PDA device of FIG. 14, in accordance with various aspects of the present invention.
Figure 16A:
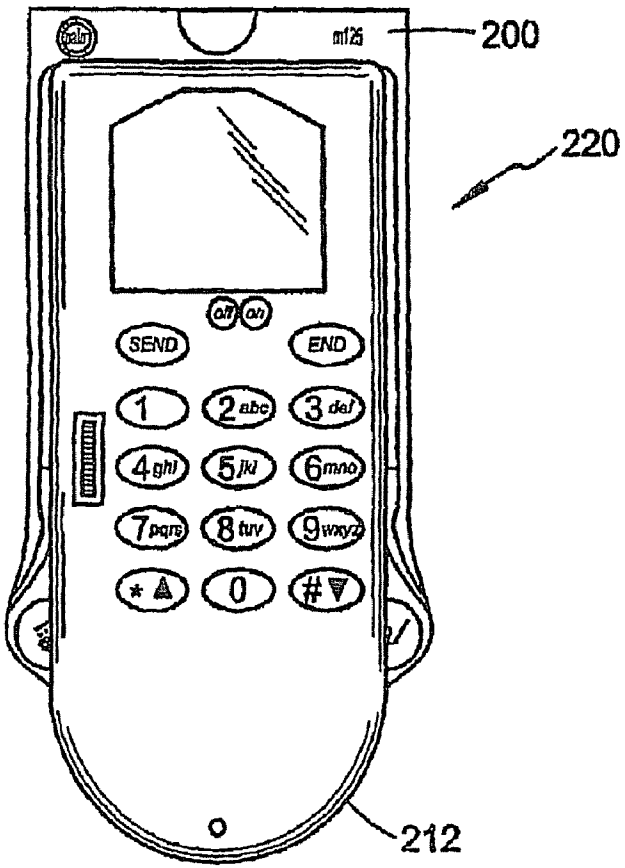

FIGS. 16A and 16B illustrate two embodiments 220 and 221 of docking the cellular telephone of FIG. 15 with the PDA device of FIG. 14, in accordance with various aspects of the present invention. Referring to the embodiment 220, the cellular telephone 212 is docked to the front of the PDA device 200 such that the electrical connector 201 mates to the docking connector 217. In such an embodiment 220, the front of the cellular telephone 210 is facing outward and the back of the cellular telephone 211 covers the front of the PDA device such that the cellular telephone 212 acts as a lid for the PDA device 200.

In such a configuration, the front of the PDA device 200, including the display 202, is protected by the cellular telephone 212. Also, the cellular telephone 212 may still function as a fully operational cellular telephone when docked to the PDA device 200. In accordance with an embodiment of the present invention, data may be exchanged between the PDA device 200 and the cellular telephone 212 via the electrical connector 201 and the docking connector 217. However, the cellular telephone 212 may be undocked from the PDA device 200 in order to use the cellular telephone 212 or the PDA device 200 as a standalone device.

Referring to the embodiment 221, the cellular telephone 212 is docked to the front of the PDA device 200 such that the electrical connector 201 mates to the docking connector 215. In such an embodiment 221, the back of the cellular telephone 211 is facing outward and the front of the cellular telephone 210 is covering a bottom portion of the front of the PDA device 200. The display 202 of the PDA device 200 is still visible to the user. In such a configuration, the user may use the keyboard 216 of the cellular telephone 212 to enter alphanumeric data to, for example, draft an e-mail message.

In accordance with an embodiment of the present invention, data may be exchanged between the PDA device 200 and the cellular telephone 212 via the electrical connector 201 and the docking connector 215 in order to facilitate, for example, drafting of an e-mail message. For example, the e-mail message may be displayed on the display 202 of the PDA device 200 during the drafting process. The PDA device may include a wireless interface, for example, to a wide area network (WAN) in order to send the e-mail message.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A portable computing device including a selectively removable communication apparatus provided in conjunction therewith comprising:

a portable computing device having a housing having at least one selectable docking port associated therewith, a selectively removable communication apparatus having at least two selectable docking ports such that the communication apparatus is capable of mechanically docking and interfacing to the portable computing device in at least two operable configurations relative to the portable computing device; and wherein the communication apparatus includes a keypad interface on both sides thereof, one of which is accessible when docked to the portable computing device in at least one operable configuration, and the other of which is accessible when docked to the portable computing device in at least one other operable configuration.

2. A portable computing device including a selectively removable communication apparatus provided in conjunction therewith comprising:

a portable computing device having a housing having at least one selectable docking port associated therewith, a selectively removable communication apparatus having at least two selectable docking ports such that the communication apparatus is capable of mechanically docking and interfacing to the portable computing device in at least two operable configurations relative to the portable computing device; and wherein the communication apparatus is docked to the front of the portable computing device such that a docking connector of the portable computing device mates with a docking connector on the communication apparatus, with the front of the communication apparatus facing outward and the back of the communication apparatus covering a display of the portable computing device to act as a lid for the portable computing device.

3. A portable computing device including a selectively removable communication apparatus provided in conjunction therewith comprising:

a portable computing device having a housing having at least one selectable docking port associated therewith, a selectively removable communication apparatus having at least two selectable docking ports such that the communication apparatus is capable of mechanically docking and interfacing to the portable computing device in at least two operable configurations relative to the portable computing device;

wherein the communication apparatus includes a first side having at least a first interface keypad, a display and a first docking connector, and a back side having at least a second docking connector for mating with a connector associated with the portable computing device; and wherein the back side of the communication apparatus further comprises a second keypad for data entry, wherein the communication apparatus may be docked with its front side or back side facing the portable computing device.

4. The portable computing device according to claim 3, wherein the first and second docking connectors allow the communication apparatus to be coupled to the portable computing device in different orientations.

5. The portable computing device according to claim 4, wherein one of the orientations positions the communication apparatus to cover a portion of the portable computing device, such that a display associated with the portable computing device is visible to a user, and the keypad associated with the communication apparatus is accessible.

*6. A portable computing device, including a selectively removable user input/output apparatus having at least one of a wired connection and a wireless connection to the portable computing device for data exchange therewith, comprising:*

*the portable computing device having a display and at least one selectable docking port, the selectively removable user input/output apparatus having a keyboard and at least one selectable docking port, such that the user input/output apparatus is capable of mechanically docking to the portable computing device in multiple configurations relative to the portable computing device;*

*wherein a first of the said configurations the display of the portable computing device and the keyboard of the user input/output apparatus face outward, and in the same general direction, enabling alpha-numeric data entry on the keyboard and display of related data on the display; and*

*wherein a second of the said configurations the user input/output apparatus and the portable computing device are attached together to allow one unit to be carried behind the other unit.*

*7. The portable computing device according to claim 6, wherein the said second of the said configurations the unit in the front remains operable.*

* * * * *